United States Patent [19]

Angelbeck et al.

[11] 4,393,503
[45] Jul. 12, 1983

[54] CAVITY LENGTH CONTROL SYSTEM FOR A MULTILINE HEL

[75] Inventors: Albert W. Angelbeck, Glastonbury; Gary E. Palma, Rocky Hills, both of Conn.

[73] Assignee: United Technologies Corporation, Hartford, Conn.

[21] Appl. No.: 193,518

[22] Filed: Oct. 2, 1980

[51] Int. Cl.³ .............................................. H01S 3/10
[52] U.S. Cl. ..................................... 372/20; 356/349; 372/18; 372/29; 372/94
[58] Field of Search ....................... 372/18, 19, 20, 32, 372/29

[56] References Cited

U.S. PATENT DOCUMENTS 4,295,741 10/1981 Palma et al. .................... 356/349

OTHER PUBLICATIONS

"Simultaneous Frequency Stabilization and Injection in a FEA–CO$_2$ Oscillator", by Lachambre et al., *Appl. Optics*, vol. 17, No. 7, Apr. 78.

Primary Examiner—William L. Sikes
Assistant Examiner—Léon Scott, Jr.
Attorney, Agent, or Firm—Eric W. Petraske

[57] ABSTRACT

A laser system for equalizing the cavity length of a multiline master oscillator and the resonant power amplifiers injection-locked by the master oscillator employs two selected lines from the beam spectrum for two-wavelength interferometric control.

4 Claims, 6 Drawing Figures

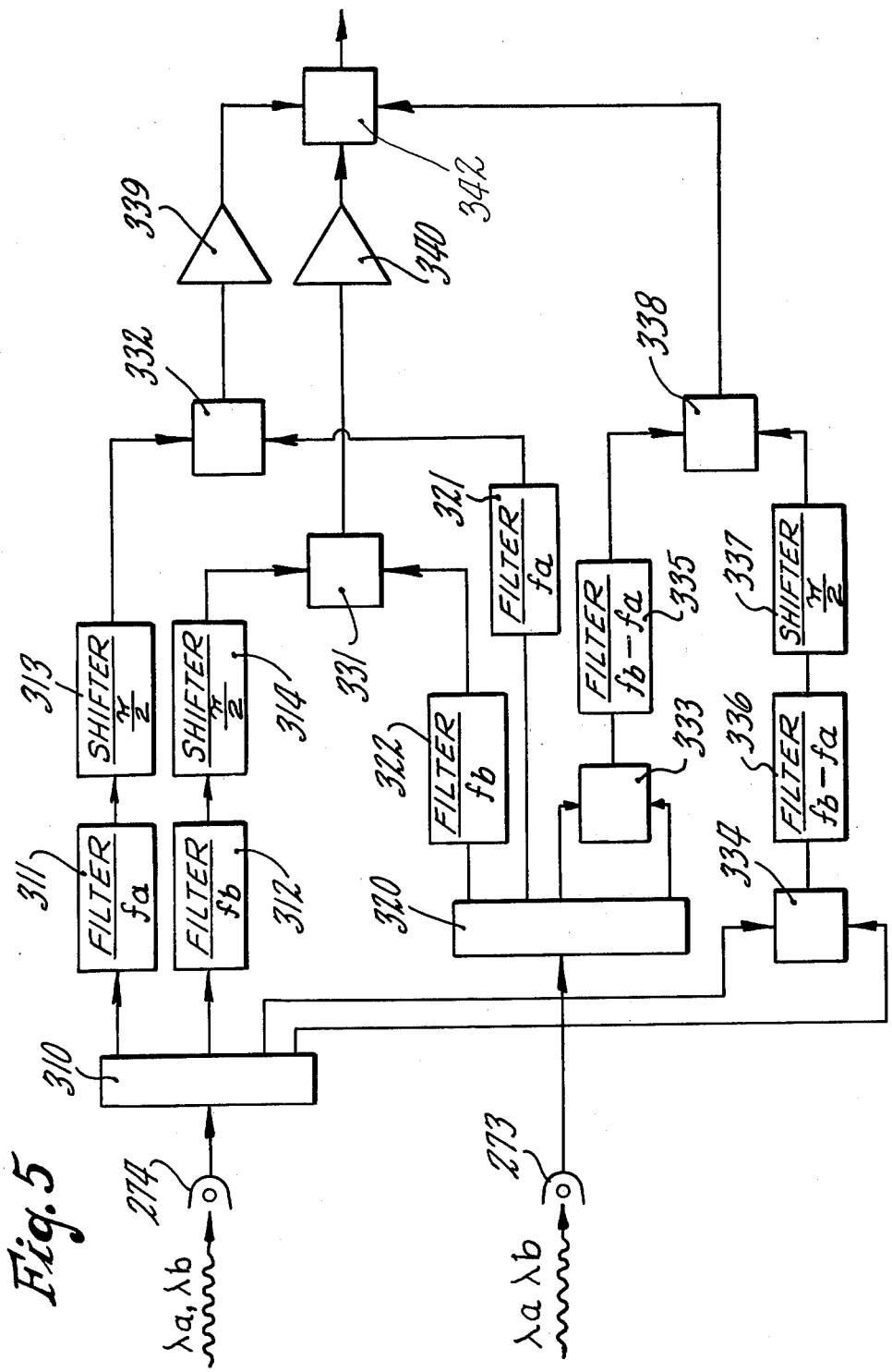

CAVITY LENGTH CONTROL SYSTEM FOR A MULTILINE HEL

The Government has rights in this invention, pursuant to Contract No. N00173-79-C-0410 awarded by the Navy.

TECHNICAL FIELD

The invention relates to method and apparatus for controlling the cavity length of an injection-locked laser by means of a two-wavelength heterodyne control system.

BACKGROUND ART

Copending, commonly assigned U.S. patent application Ser. No. 071,509, now U.S. Pat. No. 4,295,741, incorporated herein by reference, discloses a method of eliminating the $2\pi N$ ambiguity in a composite beam composed of a number of beams from a set of commonly controlled power amplifiers which receive and amplify portions of a master oscillator beam. A total combined output beam having a uniform phase front can be formed by combining the output beams in such a manner that all path lengths from the master oscillator through the several amplifiers are equal. If the path lengths differ by an integral number of wavelengths, the corresponding beams will differ in phase by $2\pi N$ radians. In the case of lasers that generate radiation over a frequency range that includes two or more spectral lines, a beam-front phase difference of $2\pi N$ radians of a fundamental or reference line implies that the associated radiation from different lines will be out of phase by an amount that is not an integral multiple of $2\pi$. In other words, only if all path lengths through the system are equal within one wavelength will the output beam have a uniform phase front at all frequencies of the output radiation.

Copending application Ser. No. 071,509 discloses a method of heterodyne interferometry that employs two selected lines of the beam. Adjusting the path lengths through different one-pass power amplifiers so that radiation from two selected lines are in phase at the output ensures that all lines will be in phase. In the path length control system, error discriminants are formed for coarse and fine control, both of which have sinusoidal dependence on path length mismatch.

DISCLOSURE OF INVENTION

This invention relates to a method of two-wavelength interferometry control of resonant cavity length in a system comprising a master oscillator and a plurality of regenerative or resonant power amplifiers, in which the resonant amplifier cavity lengths are matched to the master oscillator cavity length.

BRIEF DESCRIPTION OF DRAWINGS

FIG. 5 illustrates a control circuit for forming an error signal for cavity path length control; and FIG. 6 illustrates a system control circuit.

BEST MODE FOR CARRYING OUT THE INVENTION

Figure 1:
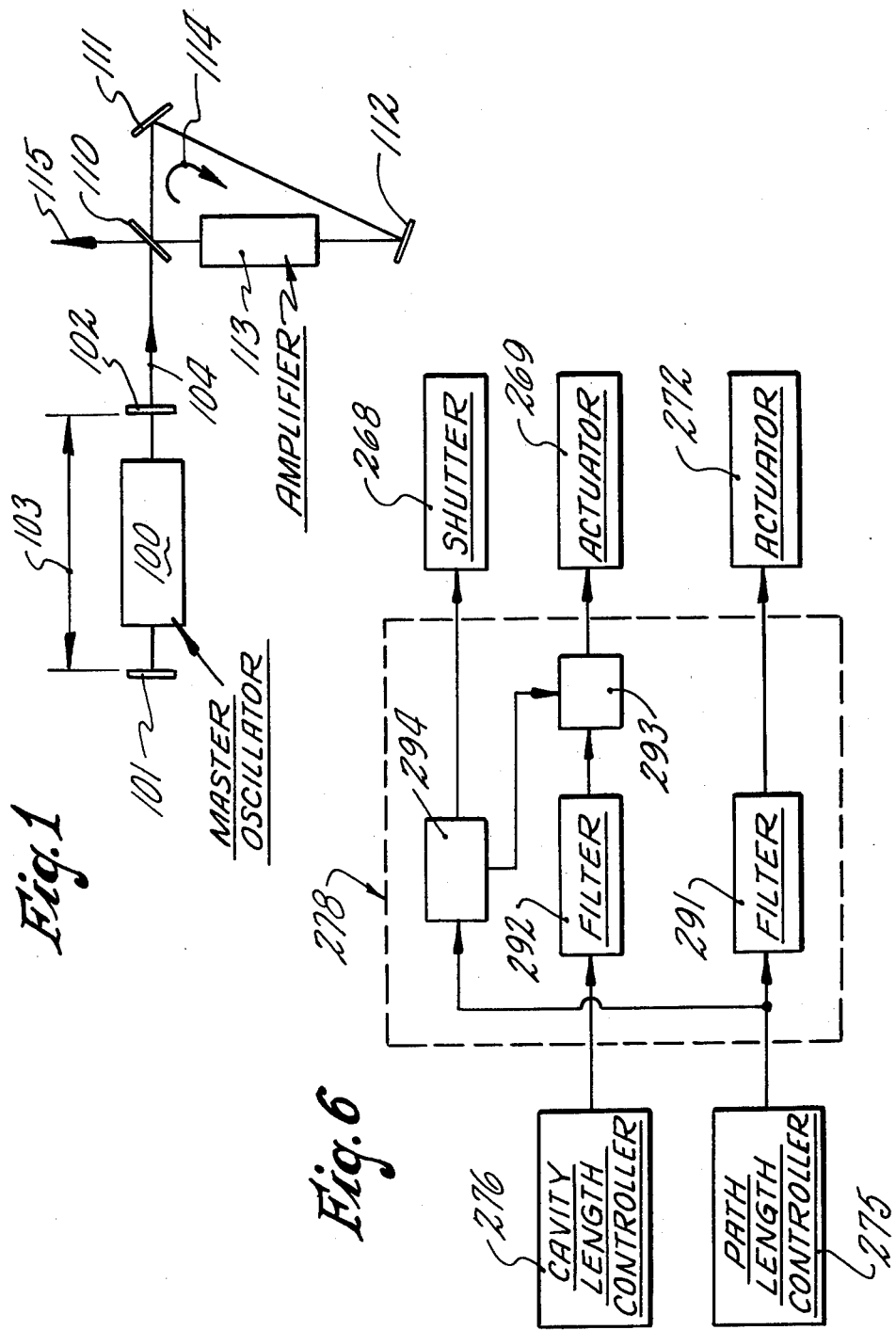
FIG. 1 illustrates the problem of cavity length matching.

In FIG. 1, a simplified diagram of a master oscillator-resonant amplifier combination illustrates the cavity length-matching problem. The master oscillator cavity is bounded by mirrors 101 and 102 and includes gain medium 100. Illustratively, gain medium 100 is a chemical-reaction medium such as Hydrogen Fluoride which emits radiation at several spectral lines. Length 103 is the distance between mirrors 101 and 102 and a round trip of the cavity is twice length 103. Master oscillator beam 104 passes through beam splitter 110 into the cavity of the power amplifier. That cavity is defined by beam splitter 110, and mirrors 111 and 112, has a length 114 and includes gain medium 113, which is the same as gain medium 100. An output beam 115 emerges from beam splitter 110. In order for the power amplifier to be injection-locked in frequency and phase to the master oscillator, it is necessary that length 114 be equal to twice length 103, else resonance feedback could not be maintained at the several frequencies emitted from the master oscillator. The beam splitter in this and the other figures may be of any type, the main consideration being that they be able to withstand high power as well as to satisfy the optical demands placed on them.

Figure 2:
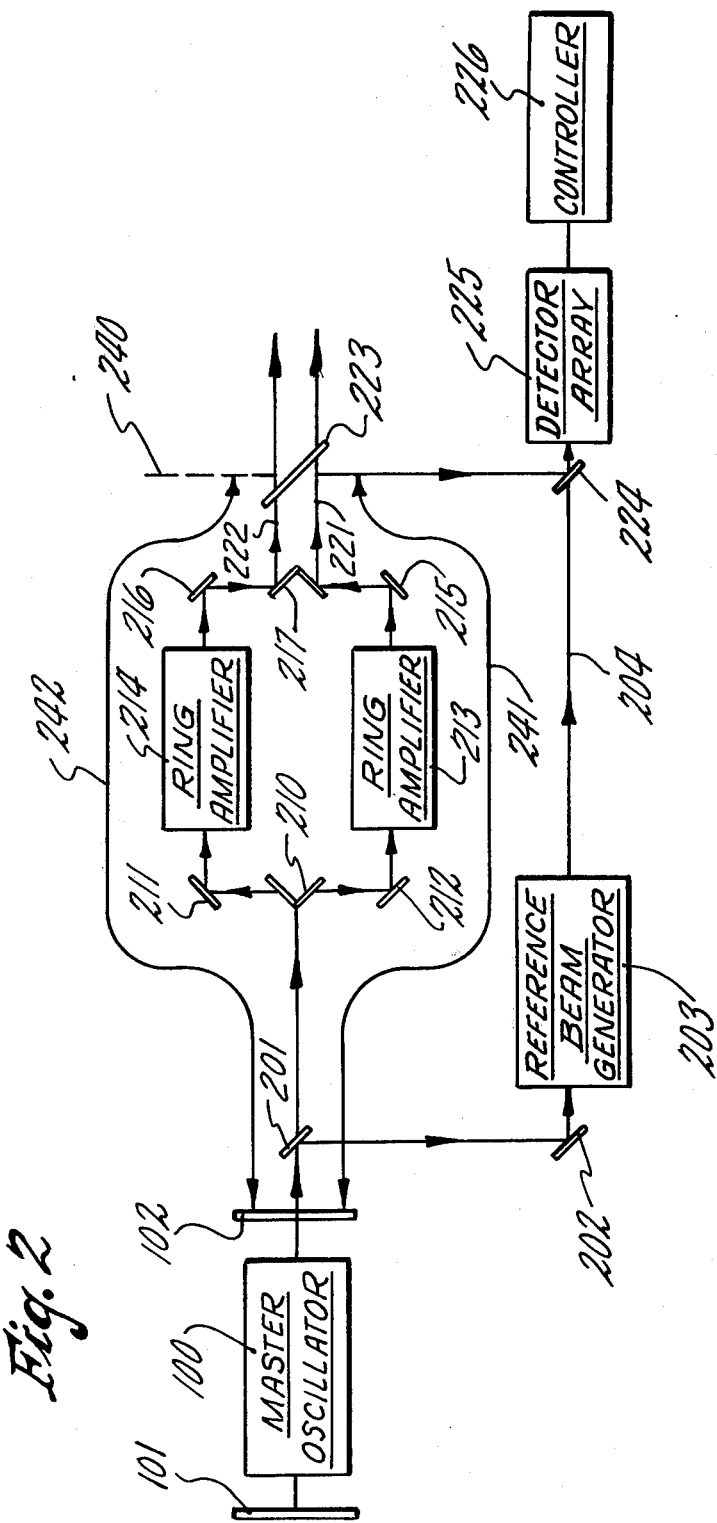
FIG. 2 illustrates the problem of path length matching.

In FIG. 2, a master oscillator, comprising gain medium 100 and end mirrors 101 and 102 emits a beam that is to control the resonant power amplifiers 213 and 214. Beam splitter 201 first deflects a portion of the input beam to use in the heterodyne reference, which portion is deflected by mirror 202 to frequency shifter 203. Shifter 203 functions as illustrated in FIG. 1 of copending application Ser. No. 071,509 to generate a two-line frequency shifted reference beam 204. The input beam continues to mirror 210, where it is split, directed to mirrors 211 and 212 and into regenerative amplifiers 213 and 214. Amplifiers 213 and 214 have cavity lengths that must be matched to the length of the master oscillator, as will be discussed further below. Output beams 221, 222 from amplifiers 213, 214 are combined by mirrors 215, 216 and 217 and directed toward beam splitter 223, which deflects a sample to beam splitter 224 and thence to detector array 225, the output of which goes to controller 226 which controls the various path lengths by adjustable mirrors not shown. The lengths of interest in the figure are lengths 241 and 242, the optical path lengths from mirror 102 through the power amplifier cavities to reference plane 240 at the output. As was discussed in copending application Ser. No. 071,509, lengths 241 and 242 must be equal in order for the composite output beam to have a uniform phase across the wave front. Controller 226 is preferably the type shown in FIG. 2 of the copending application.

Figure 3:
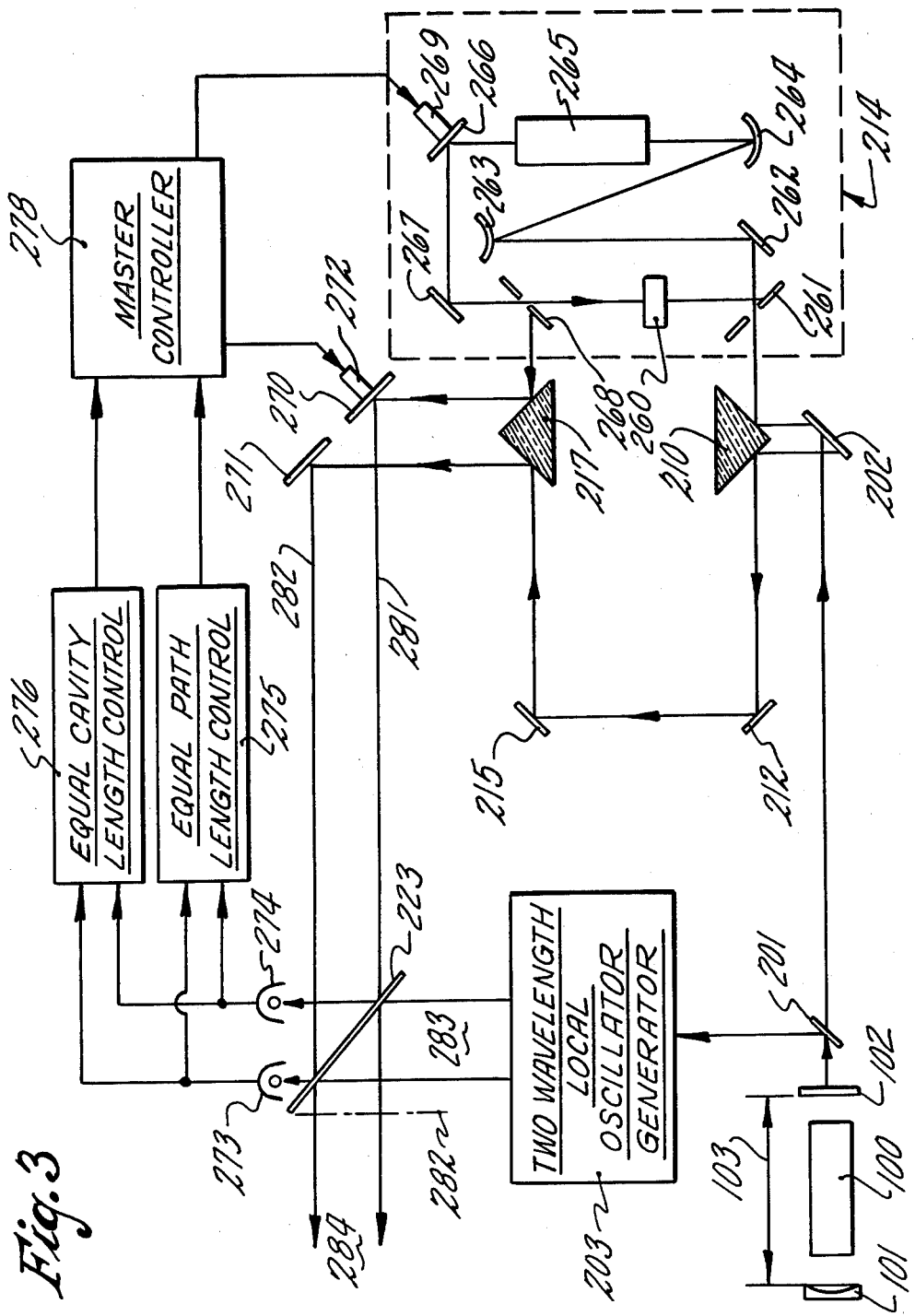
FIG. 3 illustrates an embodiment of the invention.

In FIG. 3 an embodiment of the present invention is illustrated, in which one resonant amplifier is illustrated. The system may be employed as illustrated or it may conveniently be expanded by the addition of more resonant amplifiers. A master oscillator cavity bounded by mirrors 101 and 102, including gain medium 100 and having a length 103 generates a controlling input beam, a portion of which is sampled by beam splitter 201 and directed to frequency shifter 203, which produces a two-line frequency shifted beam 283 as in FIG. 1 of the copending application. Illustratively, the two lines are shifted by 40 and 41 MHz. The remainder of the master oscillator beam passes through beam splitter 201, is deflected by mirror 202 and divided by prism 210. A reference beam 282 is deflected by prism 210, mirrors 212 and 215 and prism 217 where it rejoins the beam from the amplifier. The remainder of the input beam is deflected by prism 210 and enters the cavity of amplifier 214 through a small hole in mirror 261. The amplifier path is from mirror 261 to mirrors 262, 263, 264, through gain medium 265, to movable mirror 266, controlled by piezoelectric actuator 269 or some other adjustment means, to mirror 267 to output mirror 268, which deflects most of the beam, leaving a small resonant feedback portion to pass through a hole in mirror 268 and through shutter 260. Output beam 281 is deflected from prism 217 along a path parallel to reference beam 282. Prisms 210 and 217 are shown as having two faces in this drawing for simplicity. Alternative embodiments may be constructed in which more amplifiers are added to the system. For example, prisms 210 and 217 may be multifaceted in order to inject additional beams from an annular configuration of amplifiers. Alternative methods of combining additional amplifiers will be evident to those skilled in the art.

Reference beam 282 is deflected by fixed mirror 271 and amplified beam 281 is deflected along a parallel course by movable mirror 270, the position of which is determined by piezoelectric actuator 272. Both these beams are sampled by beam splitter 223 and continue as output beam 284, the power of which is mostly in beam 281. The sampled portion of beam 281 strikes detector 274, together with a portion of beam 283, the output of frequency shifter 203. Similarly, the sampled portion of beam 282 strikes detector 273 along with another portion of beam 283. The electrical outputs of detectors 273 and 274 serve as inputs to two controllers; one, controller 276, for maintaining the cavity length of resonator 214 equal to twice length 103 of the master oscillator cavity, and the other, controller 275, for maintaining the path length of reference beam 282 (from mirror 102 to reference plane 285) equal to the length of beam 281 from mirror 102 through the amplifier cavity to plane 285.

Controller 275 is of the type illustrated in FIG. 2 of the copending application and will not be discussed further. It controls the position of mirror 270, subject to the overriding control of master controller 278, discussed below, in order to maintain the equal path length condition discussed hereinabove in connection with FIG. 2.

Controller 276, discussed in further detail below, controls the cavity length of amplifier 214 in order to satisfy the equality of resonator length condition between master oscillation and resonant amplifier discussed in connection with FIG. 1 above.

In the initial adjustment of the system, shutter 260 is closed, so there is no contribution from resonant cavity feedback when the path lengths of beams 281 and 282 are equalized using mirror 270, according to the method of the copending application. Shutter 260 is then opened, with the result that a net phase shift between beams 281 and 282 appears at reference plane 285, this phase shift being caused by the cavity length mismatch between the master oscillator and amplifier 214. Controller 276 responds to this phase shift and starts to drive mirror 266 to a position that equalizes the cavity lengths. Such a change in the position of mirror 266 affects the total path length so that the control loops of controllers 275 and 276 are coupled.

One method of decoupling the control loops is to drill an additional hole in mirrors 261 and 268 and to make all the mirrors sufficiently large that that portion of the beam passing through these new holes and around the cavity of amplifier 214 will pass outside gain medium 265. Thus, separate portions of the beam would be used for path length control and cavity length control. An additional detector would be installed near detector 274 to sample this unamplified portion of beam 281.

A preferable method of avoiding possible instabilities arising from this coupling is to include in master controller 278 circuits to limit the bandwidth on the control loop so that mirror 266 responds to a disturbance much less quickly than does mirror 270 so that the equal length condition is met essentially continuously while the cavity length is being adjusted. Once the initial length adjustment is completed and the system is operating, the response time of the separate control loops could be further adjusted, if desired, in accordance with the sensitivity to disturbance of the different loops.

Controller 276 employs two error discriminants that respond to coarse and fine differences in path length, as shown in FIG. 3 of the copending application. Both of these discriminants are sinusoidal in form, giving rise to smoothly varying responses suited to a conventional type 1 control system, having the mirror velocity proportional to the error signal. The response of a resonant cavity to a change in length, however, has the effect of drastically changing the coarse error discriminant from that of the copending application to produce a function, shown in FIG. 4a, of the cavity length that is not sinusoidal in form and crosses zero repeatedly. Such a function would result in a cavity length mismatch, since the servo loop would drive the cavity length only to the nearest zero, not to the point of exact length equality. The counterpart fine error discriminant, shown in FIG. 4b, is also non-sinusoidal in shape.

Figure 4:
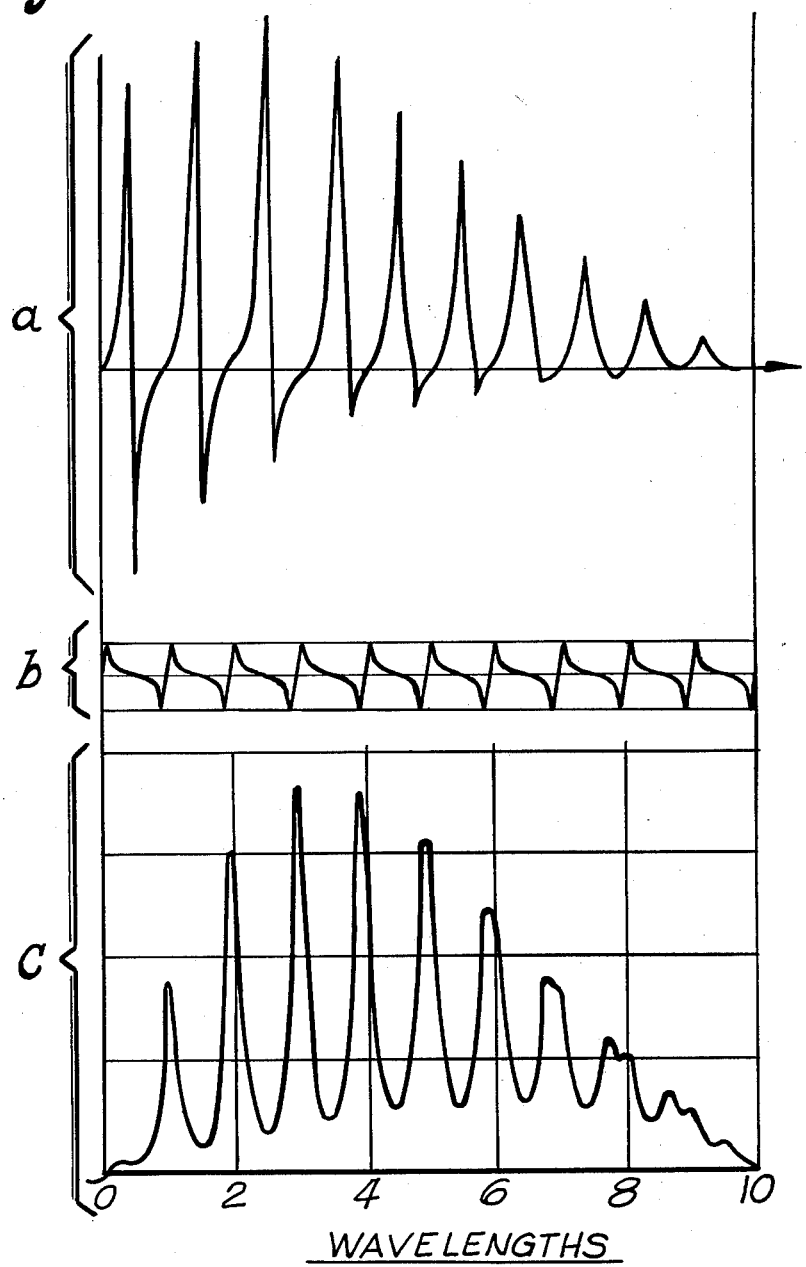
FIG. 4 illustrates an error discriminant signal according to the present invention.

It has been discovered that a combination of the coarse discriminant of FIG. 4a with two fine discriminants of the form shown in FIG. 4b, formed from the lines that are used in the coarse discriminant, has an appropriate form for a type 1 control system. Such a combined discriminant calculated for the embodiment shown in FIG. 3 is shown in FIG. 4c. In addition to having only one zero crossing in the control range, of ten wavelengths, this discriminant eliminates the process of switching from a coarse to a fine discriminant that is used in the system disclosed in the copending application.

The combined discriminant function $S_R$ may be expressed in terms of the coarse and fine functions and of the reflectivity of the ring resonator as:

$$S_R = S_c + \frac{2\sqrt{R}}{1+R}(S_{fa} - S_{fb}) \tag{1}$$

where $S_c$ is the coarse discriminant of FIG. 4a; $S_{fa}$ and $S_{fb}$ are the fine discriminants (FIG. 4b) of the two selected lines a and b that are frequency shifted in shifter 203 and used to form the coarse discriminant $S_c$, and R is the effective feedback reflectivity of the ring resonator. In the embodiment of FIG. 3, the reflectivity is taken to be 0.1 for the purpose of computing the discriminant of FIG. 4c.

The discriminant is formed in controller 276, as illustrated in FIG. 5, in which detector 273 receives radiation from the reference beam at wavelength $\lambda_a$ and $\lambda_b$, the two selected wavelengths used for the control system, and radiation from frequency shifter 203 at shifted wavelengths $\lambda_a'$ and $\lambda_b'$, the primed wavelengths differing by amounts corresponding to the frequency shifts $f_a$ and $f_b$ respectively. Similarly detector 274 receives radiation from the amplifier 214 at wavelengths $\lambda_a$ and $\lambda_b$ and from the frequency shifter at $\lambda_a'$ and $\lambda_b'$. The $\lambda_a$ and $\lambda_b$ radiation in detector 273 and 274 will differ in phase by an amount that depends on the length mismatch between the master oscillator cavity length and the cavity length of amplifier 214 (after the phase difference resulting from path length difference has been removed by controller 275). The outputs of detectors 273 and 274 will include electrical signals at frequencies $f_a$, $f_b$ and $(f_a - f_b)$, which contains the phase information to be processed. These outputs are divided in dividers 310 and 320 and filtered. Band-pass filters 311 and 321 pass signals near $f_a$, the signal from filter 311 being further shifted by $\pi/2$ in shifter 313 for convenience in forming an error signal that goes to zero when the cavity length difference goes to zero. The signal at $f_a$ from filter 321 and from shifter 313 are combined in mixer 332 to form a fine error signal of the form of that shown in FIG. 4b. Similarly, band-pass filters 312 and 322, centered at frequency $f_b$, shifter 314 and mixer 331 form another fine error signal, which has the same form as that produced by mixer 332, but differs in magnitude because the wavelength $\lambda_b$ to which it responds is different from $\lambda_a$, to which the mixer 332 signal responds. These error signals, $S_{fa}$ and $S_{fb}$ respectively in the notation of equation 1 are multiplied by constants, plus and minus K, where $K = 2\sqrt{R}/(1+R)$ in amplifiers 339 and 340 respectively and pass to summing junction 342.

The coarse error signal is formed by homodyning the signal from divider 310 in mixer 334 and that from divider 320 in mixer 333. The outputs from mixers 333 and 334 pass through band-pass filters 335 and 336, both centered at the beat frequency $f_a - f_b$, the signal from filter 336 is shifted by $\pi/2$ in shifter 337 and the signals from shifter 337 and filter 335 are combined in mixer 338 to form the coarse error signal of FIG. 4a, which passes to summing junction 340 to form the error discriminant that is an input to master controller 278. As was discussed above, master controller 278 passes the control signal to piezoelectric actuator 269, either directly or filtered in order to reduce coupling between the servo loops of controllers 275 and 276.

In FIG. 6, showing a simple version of controller 278, the signal from cavity length controller 276 passes through filter 292 and switch 293, then to piezoelectric actuator 269. The signal from controller 275 passes through filter 291 to piezoelectric actuator 272. Circuit 294 responds to the power on signal to close shutter 268 and to inhibit the signal to cavity actuator 269. Circuit 294 senses the error signal from path length controller 275 and, when path lengths have been equalized, opens shutter 260 and closes switch 293. Filters 291 and 292 limit coupling between the servo loops as discussed above. Illustratively, filter 292 will restrict the response of cavity actuator 269 so that controller 276 responds to what is essentially a constant-path situation as actuator 272 quickly compensates for the movement of actuator 269.

Variations on the embodiment of the invention disclosed above will be evident to those skilled in the art and the scope of the attached claims is not meant to be restricted to the particular embodiment disclosed here.

We claim:
1. An apparatus for controlling the cavity length of an injection locked laser comprising:

(a) means for generating a master oscillator beam;
(b) means for generating a frequency-shifted beam therefrom, having at least two lines shifted in frequency from corresponding lines in said master oscillator beam by first and second predetermined frequencies;
(c) means for transmitting a portion of said master oscillator beam as a reference beam, along a predetermined reference path length;
(d) a resonant optical cavity comprising a gain medium, means for transporting a portion of said master oscillator beam about a cavity path length passing through said gain medium, and cavity length means for varying said cavity path length;
(e) means for coupling said portion of said master oscillator beam into said optical cavity, and for coupling an amplified beam out of said cavity along an amplified beam path, including said cavity path, having a variable length substantially equal to said predetermined reference path length and path length means for varying said variable length;
(f) path length control means, responsive to said frequency-shifted beam, said reference beam and said amplified beam, for forming a signal for equalizing said predetermined reference path length and said variable length, coupled to said path length means;
(g) cavity length control means, responsive to said frequency-shifted beam, said reference beam and said amplified beam, for generating a signal for controlling said cavity path length, further comprising:
 (i) means for generating detected signals, at said first and second frequencies, from a reference detector responsive to said frequency-shifted beam and said reference beam and from an output detector responsive to said frequency-shifted beam to said amplified beam;
 (ii) means for mixing said detected signals at said first frequency from both said detectors to form a first fine error signal, means for further mixing said signals at said second frequency from both said detectors to form a second fine error signal;
 (iii) means for homodyning the detected signal from said reference detector to form a reference beat signal, having a beat frequency equal to the difference of said first and second frequencies, means for homodyning the signal from said output detector, to form an output beat signal at said beat frequency;
 (iv) means for mixing said reference beat signal and said output beat signal to form a coarse error signal; and
 (v) means for combining said first and second fine error signals with said coarse error signal in a predetermined manner to form a cavity length error signal for controlling said cavity length means.

2. An apparatus according to claim 1, in which said cavity length control means includes means for forming said cavity length error signal by subtracting said first from said second fine error signal, multiplying the remainder thereof by a predetermined factor dependent on the reflectivity of said optical cavity and adding the product thereof to said coarse error signal.

3. An apparatus according to claim 2, in which said cavity length means has a cavity response time and said path length means has a path length response time substantially less than said cavity length response time.

4. An apparatus according to claim 2, in which the components of said resonant optical cavity and of said means for transporting said amplified beam include means for coupling a second portion of said master oscillator beam into, about and out of said cavity and along said amplified beam path in such a manner that said second portion avoids said gain medium and that a second path length of said second portion beam is equal to said variable length, and in which said path length control means is responsive to said frequency-shifted beam, said reference beam and said second portion beam, whereby said path length control means and said cavity length control means are decoupled.

* * * * *